US012635707B2

(12) United States Patent
Dong

(10) Patent No.: US 12,635,707 B2
(45) Date of Patent: May 26, 2026

(54) SYSTEM AND METHOD FOR AUTOMATICALLY CLEANING AND WASHING ICE CREAM OR YOGURT MACHINE

(71) Applicant: Lingyu Dong, Temple City, CA (US)

(72) Inventor: Lingyu Dong, Temple City, CA (US)

( * ) Notice: Subject to any disclaimer, the term of this patent is extended or adjusted under 35 U.S.C. 154(b) by 155 days.

(21) Appl. No.: 18/413,004

(22) Filed: Jan. 15, 2024

(65) Prior Publication Data

US 2024/0268410 A1      Aug. 15, 2024

Related U.S. Application Data

(63) Continuation of application No. 17/316,704, filed on May 10, 2021, now Pat. No. 11,612,173.

(51) Int. Cl.
A23G 9/30 (2006.01)
A23G 7/00 (2006.01)

(52) U.S. Cl.
CPC A23G 9/30 (2013.01); A23G 7/00 (2013.01)

(58) Field of Classification Search
CPC ............ A23G 9/30; A23G 7/00; B08B 3/024; B08B 13/00
See application file for complete search history.

(56) References Cited

U.S. PATENT DOCUMENTS

| | | | | |
|---|---|---|---|---|
| 4,860,550 A * | 8/1989 | Aoki | ....................... | A23G 9/163 |
| | | | | 62/135 |
| 6,145,701 A * | 11/2000 | Van Der Merwe | .... | A23G 9/283 |
| | | | | 222/146.6 |
| 2002/0043071 A1* | 4/2002 | Frank | ....................... | A23G 9/20 |
| | | | | 62/135 |
| 2006/0243310 A1* | 11/2006 | Cocchi | ................... | A23G 9/045 |
| | | | | 134/134 |
| 2011/0186081 A1* | 8/2011 | Dunn | ....................... | B08B 3/045 |
| | | | | 134/184 |
| 2017/0347682 A1* | 12/2017 | Dong | ....................... | A23G 9/30 |

FOREIGN PATENT DOCUMENTS

EP          1254603 A2 *  11/2002   ............... A23G 9/30

* cited by examiner

*Primary Examiner* — Emmanuel E Duke
(74) *Attorney, Agent, or Firm* — Raymond Y Chan; David & Raymond Patent Firm

(57) ABSTRACT

A system for automatically cleaning and washing an ice cream machines includes a liquid container for storing raw materials; a freezing cylinder connected with the liquid container through a cleaning pathway; a water tank for storing rinse water to rinse the freezing cylinder and the cleaning pathway; a detergent tank for storing detergents to clean and wash the freezing cylinder and the cleaning pathway; a pump arranged on the cleaning pathway to selectively pump the raw material, the rinse water or the detergent; and a control panel adapted to control an on/off and cleaning.

20 Claims, 10 Drawing Sheets

3'     100'

100'

3'

311'

111'

SYSTEM AND METHOD FOR AUTOMATICALLY CLEANING AND WASHING ICE CREAM OR YOGURT MACHINE

CROSS REFE35U.S.C.§ 120 RENCE OF RELATED APPLICATION

This application is a Continuation application that claims the benefit of priority under 35U.S.C. § 120 to a non-provisional application, application Ser. No. 17/316,704, filed May 10, 2021, now Patent Number U.S. Pat. No. 11,612,173, which is a Continuation application that claims the benefit of priority under 35U.S.C. § 120 to a non-provisional application, application Ser. No. 15/455,153, filed Mar. 10, 2017, now Patent Number U.S. Pat. No. 11,033,043, which is a Continuation-In-Part application that claims the benefit of priority under 35U.S.C. § 120 to a non-provisional application, application Ser. No. 15/431, 773, filed Feb. 14, 2017, now Patent Number U.S. Pat. No. 11,419,348, which is a non-provisional application that claims the benefit of priority under 35U.S.C. § 120 to a provisional application, application No. 62/345,765, filed Jun. 4, 2016, which are incorporated herewith by references in their entities.

BACKGROUND OF THE PRESENT INVENTION

Field of Invention

The present invention relates to ice cream and yogurt machine cleaning and washing, and more particularly to a system and method for cleaning and washing ice cream or yogurt machine automatically.

Description of Related Arts

Traditional ice cream and yogurt machines or makers are required to periodical wash and clean in order to prevent serious sanitary problems, such as bacterial growth and contamination, generated inside components of the ice cream machines or makers. Generally, due to the complicated structure of the ice cream or yogurt machine, it has to be cleaned and washed manually at least every two to three weeks.

A common cleaning method is the Pasteurization method that does not require to drain out the raw materials inside the direct expansion evaporator cylinder but simply heats the ice cream or yogurt making system, including the direct expansion evaporator cylinder, to a temperature such as 65° C. and keeps such temperature for around 30 minutes. Then, the ice cream or yogurt making system is cooled down to 5° C. in 30 minutes in order to kill the bacteria therein with hot ice cream or yogurt raw material. Each cleaning process must be operated around every 15 days. However, the Pasteurization method, in fact, is not a cleaning nor washing method because the direct expansion evaporator cylinder and the pipelines of the ice cream or yogurt machine have not been actually cleaned or washed but simply try to raise the temperature to kill the bacteria. Practically speaking, the ice cream or yogurt original contained in the ice cream or yogurt machine which had been heated to 65° C. are not suitable to consume and must be drained out to abandon and discard. In addition, this Pasteurization method is not suitable for yogurt because the probiotics in the yogurt will also be killed at the temperature of 65° C.

In order to really clean and wash the ice cream or yogurt machine, it must be disassembled so as to wash and clean the interior of the direct expansion evaporator, the dispenser mechanism and their pipelines manually. For example, in the traditional washing method, the raw materials inside the direct expansion evaporator cylinder is required to be drained out first, and then the cleaning water and detergents are injected into the pipelines of the ice cream machines or markers to drain out the residue inside the ice cream machines or markers.

However, the traditional cleaning and washing method for ice cream machines or markers have several drawbacks.

The dispensing components such as the plunger, the mix hopper, the draw spout, the draw handle, the sector gear, and etc., are required to be disassembled in order to reach the pipelines of flowing passages to clean such components and pipelines. In addition, each part of the components is required to be manually disassembled and reassembled by hand or accessories, so lots of labor and time have to spend during the traditional cleaning and washing method. In other words, since the ice cream or yogurt machine and marker are required to be cleaned and washed periodically, the components are easily to be damaged and broken during disassembling and reassembling. Furthermore, some components of the ice cream machine and marker cannot be cleaned and washed effectively, such as the freezing cylinders (direct expansion evaporator) and valves, so the cleaning and washing efficiency of the traditional washing and cleaning method is relatively low, and the components which cannot be fully cleaned or washed and are easily eroded, and in such a manner, not only that components needs to be repaired, but also that the finished ice cream will be contaminated.

SUMMARY OF THE PRESENT INVENTION

The invention is advantageous in that it provides a system and method for automatically cleaning and washing the ice cream or yogurt machine, wherein the components of the ice cream machines don't need to be disassembled during the cleaning operation in order to enhance the efficiency for cleaning and washing the ice cream or yogurt machine as well as prolong the life-span of the ice cream and yogurt machines.

Another advantage of the invention is to provides a system and method for automatically cleaning and washing the ice cream or yogurt machine, wherein not only the pipelines, including all flowing passages of the ice cream or yogurt, but also the interior of the freezing cylinder of the ice cream or yogurt machine can be washed and cleaned thoroughly, so as to enhance the efficiency for cleaning and washing the ice cream machines.

Another advantage of the invention is to provide a system and method for automatically cleaning and washing the ice cream or yogurt machine, wherein the system comprises a control panel to not only control an on/off operation but also a cleaning operation of the ice cream or yogurt machine automatically without any labor in looking after or disassembling any part or component thereof during the cleaning and washing process.

Another advantage of the invention is to provide a system and method for automatically cleaning and washing the ice cream machines, wherein the liquid raw material container can be selectively changed to the water tank or detergent tank during the cleaning and washing process, so as to simply the pipeline and structure of the ice cream or yogurt machine.

Another advantage of the invention is to provide a system and method for automatically cleaning and washing the ice cream machines, wherein the cleaning and washing method is a clean-in-place process that can thoroughly clean and wash all the flowing passages of the ice cream or yogurt, including the interior of the freezing cylinder and the pipelines of the ice cream or yogurt without moving or disassembling any component and connecting any additional equipment to the ice cream or yogurt machine.

Another advantage of the invention is to provide a system and method for automatically cleaning and washing the freezing cylinder of the ice cream or yogurt machine, wherein the refrigerant and the heat exchange channel therein of the freezing cylinder (direct expansion evaporator) which is thermally communicating with the feeding channel of the freezing cylinder with the refrigerant flowing therein for cooling the ice cream or yogurt raw material to frozen product are alternatively and selectively utilized to heat up the frozen ice cream or yogurt in the freezing cylinder for draining out and the cleaning liquid fed into the freezing cylinder for cleaning and washing after the raw material has been drained out.

Additional advantages and features of the invention will become apparent from the description which follows, and may be realized by means of the instrumentalities and combinations particular point out in the appended claims.

According to the present invention, the foregoing and other objects and advantages are attained by a system for automatically cleaning and washing an ice cream or yogurt machine, wherein the system comprises:

a liquid container for storing raw materials;

a freezing cylinder connected with the liquid container through a cleaning pathway;

a rinse containing device comprising at least a water tank for storing rinse water to rinse the freezing cylinder and cleaning pathway which may further comprise a detergent tank for storing one or more detergents to clean and wash the freezing cylinder and cleaning pathway;

a pump arranged on the cleaning pathway to selectively pump the raw material, the rinse water and/or the detergent; and a control panel adapted to control an on/off and cleaning operation.

In accordance with another aspect of the invention, the present invention comprises a method for automatically cleaning and washing an ice cream or yogurt machine, wherein the method comprises the following steps:

(a) Stop feeding the raw materials to the freezing cylinder.

(b) Absorb the residues inside the freezing cylinder, and drain out the residues.

(c) Inject the rinse liquid including water and one or more detergents through the freezing cylinder and the pipeline.

(d) Inject rinse water through the freezing cylinder and the pipeline.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
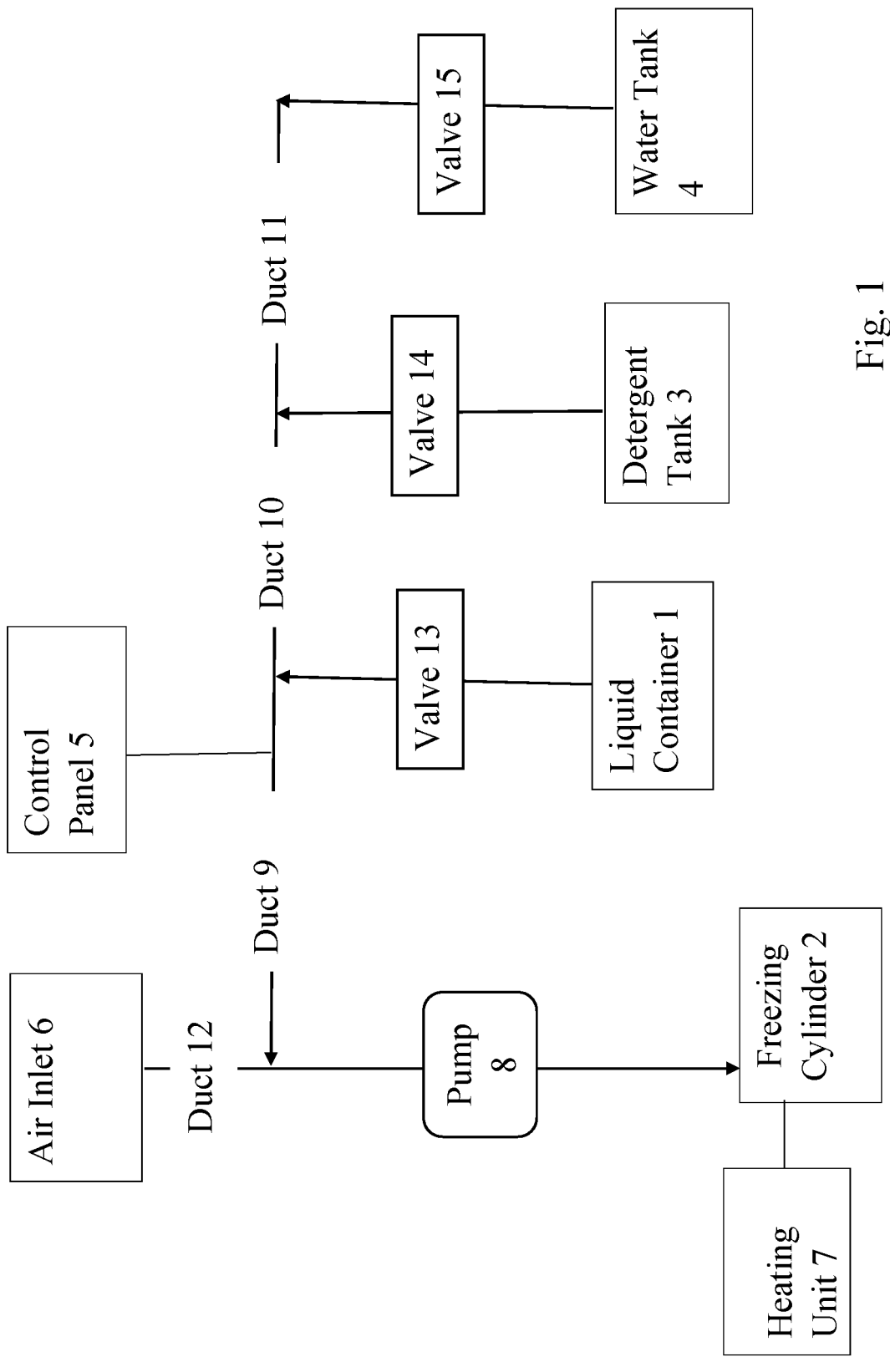
FIG. 1 is a block diagram of a method and system for automatically cleaning and washing ice cream machines according to a first preferred embodiment of the present invention.

Referring to FIG. 1 of the drawings, a system for automatically cleaning and washing ice cream or yogurt machine according to a preferred embodiment of the present invention is illustrated, wherein the system comprises a liquid container 1 for storing raw materials for products such as ice cream, yogurt, beverages and the like in frozen manner, a freezing cylinder 2, for example a direct expansion evaporator, connecting with the liquid container 1 and a dispensing device through a pipeline, adapted to make the ice cream or yogurts from the raw materials, a rinse containing device for storing a rinsing liquid, which may include a detergent tank 3 for storing one or more detergents and a water tank 4 for storing the rinse water, an air inlet 6 adapted to conduct outside air to the freezing cylinder, a pump 8 adapted to selectively pump the raw materials or the detergents and the rinse water into the freezing cylinder 2, and a control panel 5 adapted to control an on/off and a cleaning operation of the ice cream or yogurt machine. In addition, the liquid container 1, the freezing cylinder 2, the detergent tank 3, and the water tank 4 are connected with each other through a pipeline, wherein the pipeline comprises a duct 9, a duct 10, a duct 11, and a duct 12 defining a cleaning pathway, wherein the raw materials stored inside the liquid container 1 is fed from the liquid container 1 to the freezing cylinder 2 through the duct 9, and the ice cream or yogurt is made in the freezing cylinder 1 and dispensed through a dispensing system of the ice cream or yogurt machine. In some embodiments, the air can be conducted into the freezing cylinder 1 through the air inlet 6, so the air is mixed with the raw materials inside the freezing cylinder 2 so as to produce the soft-serve products such as ice cream, yogurt, beverages and the like.

According to the first preferred embodiment, the one or more detergents can be fed from the detergent tank 3 to the freezing cylinder 2 through the duct 10 which is integrally connected with the duct 9. The rinse water is fed from the water tank 4 to the freezing cylinder through the duct 11 which is integrally connected with the duct 10. In other words, since the raw materials is fed through the duct 9 to the freezing cylinder 2, the residue will be remained inside the duct 9 and the freezing cylinder 2.

It is worth mentioning that the detergents may also be premixed with the water and contained in the detergent tank 3 and fed into the freezing cylinder 2 through the duct 10. Also, the rinse water can be supplied from a water supply such as a water faucet connected to the duct 11 or the duct 10 via a three-way valve.

Generally, the raw materials for freezing into ice cream or yogurt are fed from the liquid container 1 to the freezing cylinder 2 through the duct 9 by the pump 8, wherein the raw materials will be frozen by the freezing cylinder 2 and dispensed through the dispensing system, and the frozen ice cream or yogurt residues will be remained inside the duct 9 and freezing cylinder 2 even after the raw materials are drained out of the system. Therefore, the rinse water stored inside the rinse water tank 4 and the detergent stored inside the detergent tank 3 are fed through the duct 9 to the freezing cylinder 2 in order to efficiently clean the pipeline and the freezing cylinder 2 of the ice cream or yogurt machine.

The system according to the first preferred embodiment of the present invention further comprises a heating unit 7 operatively connected with the freezing cylinder 2 to heat the freezing cylinder 2, wherein the heating unit 7 is adapted to absorb the ice cream residues remaining inside the freezing cylinder 2, so as to facilitate the ice cream or yogurt residues being completely drained out from the freezing cylinder 2. In addition, after the rinse water fed into the freezing cylinder 2, the rinse water can also be heated by the heating unit 7 to clean and wash out all the ice cream or yogurt residues, and then the freezing cylinder 2 can be rinsed more efficiently by the heated rinse water.

According to the first preferred embodiment, the pump 8 is a peristaltic pump, wherein the pump 8 can be activated by the control panel 5 to pump the raw materials, the detergents, or the rinse water to the freezing cylinder 2. The system further comprises a valve 13 arranged at the duct 9, a valve 14 arranged at the duct 10, and a valve 15 arranged at the duct 11. Accordingly, while only the valve 13 is opened, only the raw materials stored in the liquid container 1 is fed to the freezing cylinder 2. While only the valve 14 is opened, only the detergents are fed to the freezing cylinder 2. While only the valve 15 is opened, only the rinse water is fed to the freezing cylinder 2.

According to the first preferred embodiment, the control panel 5 comprises an on/off module and a cleaning operation module, wherein the on/off module can be activated to turn on and turn off the operation of the freezing cylinder 2, and the cleaning operation module can be activated to turn on and turn off the cleaning operation. It is worth to mention that the cleaning operation module can be activated to turn on and turn off the cleaning operation by times or usage, that is to turn on and turn off the cleaning operation of the cleaning and washing system of the ice cream or yogurt machine automatically at predetermined or preset times, or to turn on and turn off the cleaning operation of the cleaning and washing system of the ice cream or yogurt machine manually according to the need of the user of the ice cream or yogurt machine. In other words, the cleaning operation can be set up to turn on/turn off by times, such as one week per time, three days per time, or daily, and in addition, the cleaning operation module also can be set up to turn on/turn off the cleaning operation by usage, such as that the cleaning operation module can be activated to turn on the cleaning operation while the raw materials stored inside the liquid container 1 are pumped to the freezing cylinder 2 by 100 loads. And, the control panel 5 further comprises a sensor connected to the freezing cylinder 2 to detect the usage loads of the liquid containers 1. It is worth mentioning that the control panel 5 further comprises a valve module to control an on/off operation of each of the valve 13, the valve 14, and valve 15.

Figure 2:
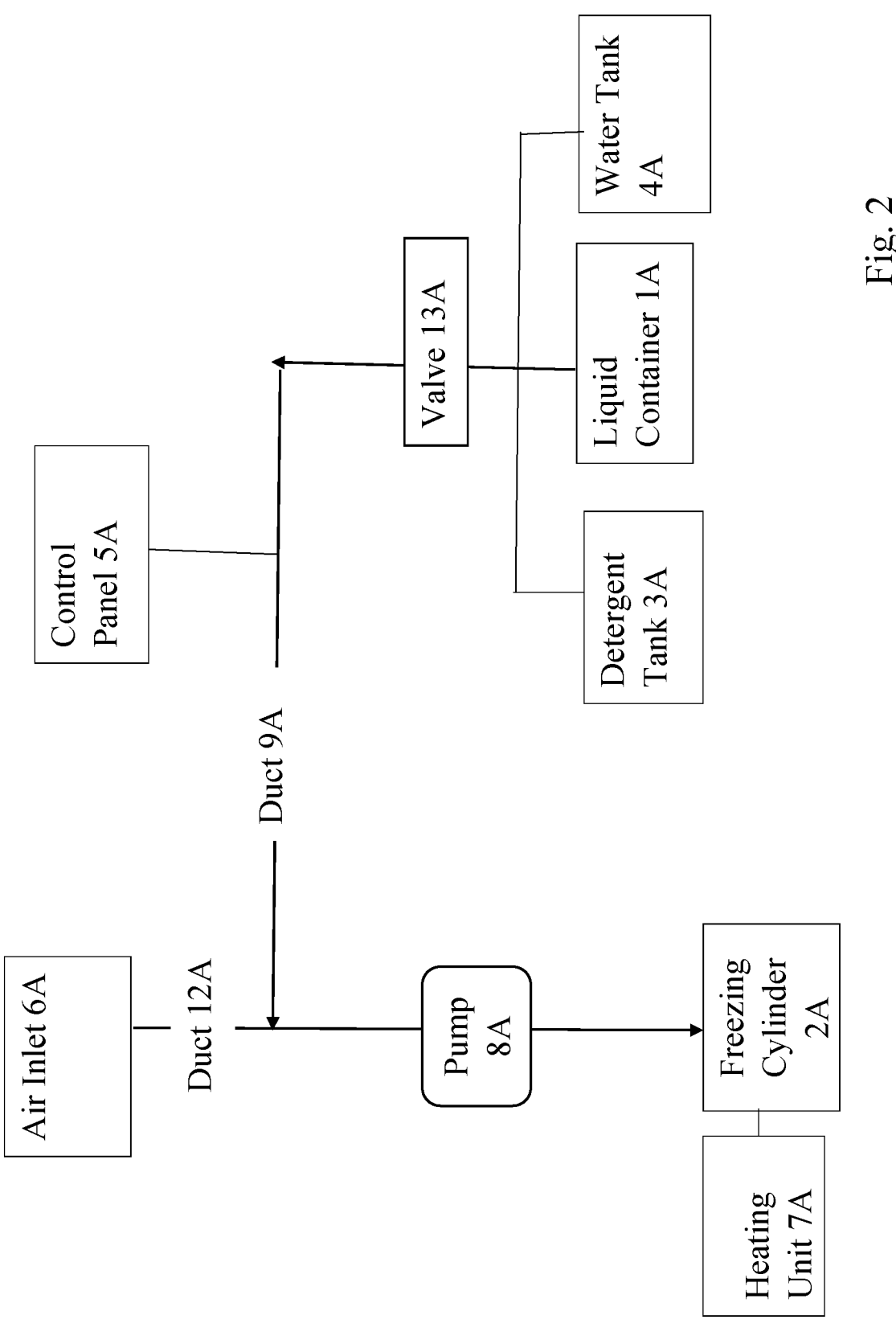
FIG. 2 is a block diagram of a method and system for automatically cleaning and washing ice cream machines according to a second preferred embodiment of the present invention.

Referring to FIG. 2 of the drawings, a system of automatically cleaning and washing the ice cream or yogurt machine according to a second preferred embodiment of the present invention is illustrated, wherein the system comprises a liquid container 1A for storing raw materials for the soft-serve products, such as ice cream, yogurt, beverages and etc., a freezing cylinder 2A adapted to freeze the raw materials to make the frozen ice cream or yogurts, a rinse containing device which may comprises a detergent tank 3A for storing one or more cleaning detergents and a water tank 4A for storing the rinse water, an air inlet 6A adapted to conduct outside air to the freezing cylinder 2A, a pump 8A adapted to pump the raw materials, the detergent, and the rinse water into the freezing cylinder 2A, and a control panel 5A adapted to control an on/off and a cleaning operation of the ice cream or yogurt machine, wherein the raw materials stored inside the liquid container 1A is fed from the liquid container 1A to the freezing cylinder 2A through the duct 9A, and the ice cream or yogurt is made in the freezing cylinder 2A. In one embodiment, the air can be conducted into the freezing cylinder 2A through the air inlet 6A, so the air can be mixed with the raw materials inside the freezing cylinder 2A so as to produce the ice cream or yogurt product.

The liquid container 1A can be selectively replaced by rinse containing device, such as the water tank 4A or detergent tank 3A, in order to process the cleaning operation, wherein the liquid container 1A, the water tank 4A, and the detergent tank 3A can be selectively connected to the duct 9A to selectively pump the raw materials, the rinse water, or the detergents into the freezing cylinder 2A.

The system according to the second preferred embodiment of the present invention may further comprise a heating unit 7A operatively connected with the freezing cylinder 2A to heat the freezing cylinder 2A, wherein the heating unit 7A is adapted to absorb the ice cream or yogurt residues remaining inside the freezing cylinder 2A, so as to facilitate the ice cream or yogurt residues being drained out from the freezing cylinder 2A. In addition, after the rinse water fed into the freezing cylinder 2A, the rinse water can be selectively heated by the heating unit 7A, and then the freezing cylinder 2A can be rinsed by the rinse water or heated rinse water.

The system according to the second preferred embodiment of the present invention may further comprise a valve 13A arranged at the duct 9A. Accordingly, while the valve 13A is opened, the raw materials stored inside the liquid container 1A is fed to the freezing cylinder 2A as long as the duct 9A is connected to the liquid container 1A. If the duct 9A is connected to the detergent tank 3A, the detergents are fed to the freezing cylinder 2A. If the duct 9A is connected to the water tank 3A, the rinse water is fed to the freezing cylinder 2A.

According to the second preferred embodiment, the control panel 5A comprises an on/off module and a cleaning operation module, wherein the on/off module can be activated to turn on and turn off the operation of the freezing cylinder 2A, and the cleaning operation module can be activated to turn on and turn off the cleaning operation. It is worth mentioning that the cleaning operation module can be activated to turn on and turn off by times or usage, wherein the cleaning operation can be set up to turn on/turn off automatically according to predetermined or preset times, such as one week per time, three days per time, or daily after the business hours, and the cleaning operation module also can be set up to turn on/turn off by usage, that is being manually activated by the user according to his or her actually need. For example, the cleaning operation module can be activated to turn on the cleaning operation while the raw materials stored inside the liquid container 1A are pumped to the freezing cylinder 2A by 100 loads. And, the control panel 5A may further comprise a sensor connected to the liquid container 1A to detect the usage loads of the liquid containers 1A. It is worth to mention that the control panel 5A further comprises a valve module to control an on/off operation of the valve 13A.

According to the above preferred embodiments, it is worth mentioning that the system for cleaning and washing the ice cream or yogurt machine includes mostly the components of the ice cream or yogurt machine, such as the liquid container 1, 1A, the freezing cylinder 2, 2A, the pump 8, 8A, and the control panel 8, 8A. In order to convert an ice cream or yogurt machine to equip with the system for cleaning and washing the ice cream or yogurt machine, the machine may simply be modified to provide the ducts 9, 10, 11, 12, the rinse containing device including the water and detergent tanks 3, 3A, 4, 4A, and the valves 13, 14, 15, and to modified the control panel 5, 5A to provide the on/off module and cleaning operation module.

According to the above first and second preferred embodiments, a method for automatically cleaning and washing the ice cream or yogurt machine is provided, wherein the method comprises the steps of:

(a) stopping feeding the raw materials to the freezing cylinder 2, 2A;

(b) absorbing the ice cream or yogurt residue inside the freezing cylinder 2, 2A, and draining out the residue;

(c) injecting the water through the freezing cylinder 2, 2A and the pipeline; and/or (d) injecting the one or more detergents or detergents mixed with water through the freezing cylinder 2, 2A and the pipeline; and (e) finally, injecting the rinse water through the freezing cylinder 2, 2A and the pipeline.

In the step (a), the pump 8, 8A is activated to be turned off by the control panel 5, 5A, so that no raw material is fed into the freezing cylinder 2, 2A. Alternatively, the valve 13 can be turned off by the control panel 5, 5A, no raw material is fed into the freezing cylinder 2, 2A. It is worth to mention that, in the second preferred embodiment, the liquid container, 1A can be selectively replaced by the rinse containing device, including the water tank 4A and/or the detergent tank 3A, so that while the valve 13A is opened, the raw materials, the rinse water, or the detergents can be selectively fed into the freezing cylinder 2A through the duct 9A.

In the step (b), the freezing cylinder 2,2A is heated by the heating unit 7, 7A, and the ice cream or yogurt residue is dissolved and absorbed by the heated water or water mixed with detergents and then drained out from the freezing cylinder 2, 2A.

In the step (c), in the first preferred embodiment, the valve 13 and the valve 14 are closed, the valve 15 is turned on, and the pump is turned on, so that the rinse water can be fed through the pipeline and the freezing cylinder 2, so as to clean and wash the pipeline and the freezing cylinder 2.

Accordingly, the step (c) further comprises a step of (c1): heating the rinse water, wherein the heated rinse water is passing through the pipeline and the freezing cylinder 2, 2A, so as to wash and clean the pipeline and the freezing cylinder 2, 2A. In other words, the heated rinse water has a better washing efficiency than the regular temperature rinse water.

In the step (d), in the first preferred embodiment, the valve 13 is closed, the valve 14 is turned on, and the pump 8 is turned on, so that the one or more detergents can be fed through the pipeline and the freezing cylinder 2, so as to clean and wash the pipeline and the freezing cylinder 2.

In the step (e), the detergent residue can be cleaned and drained out by the rinse water. In other words, the one or more detergents are usually chemicals, so it may cause harmful for the human body. Therefore, the step (e) can prevent the detergents remained inside the pipeline and the freezing cylinder 2, 2A. Of course, if the detergents are made of edible elements, the step (e) may also be omitted.

Figure 3:
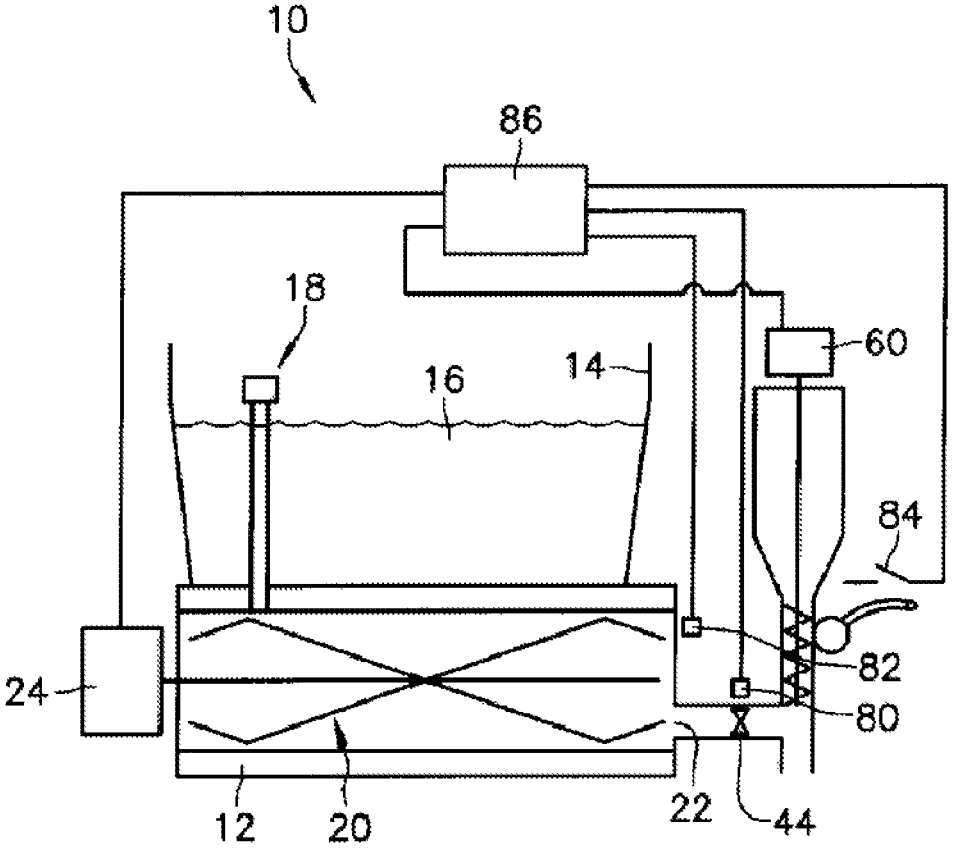
FIG. 3 is a schematic view illustrating an exemplary ice cream or yogurt machine.
Figure 4:
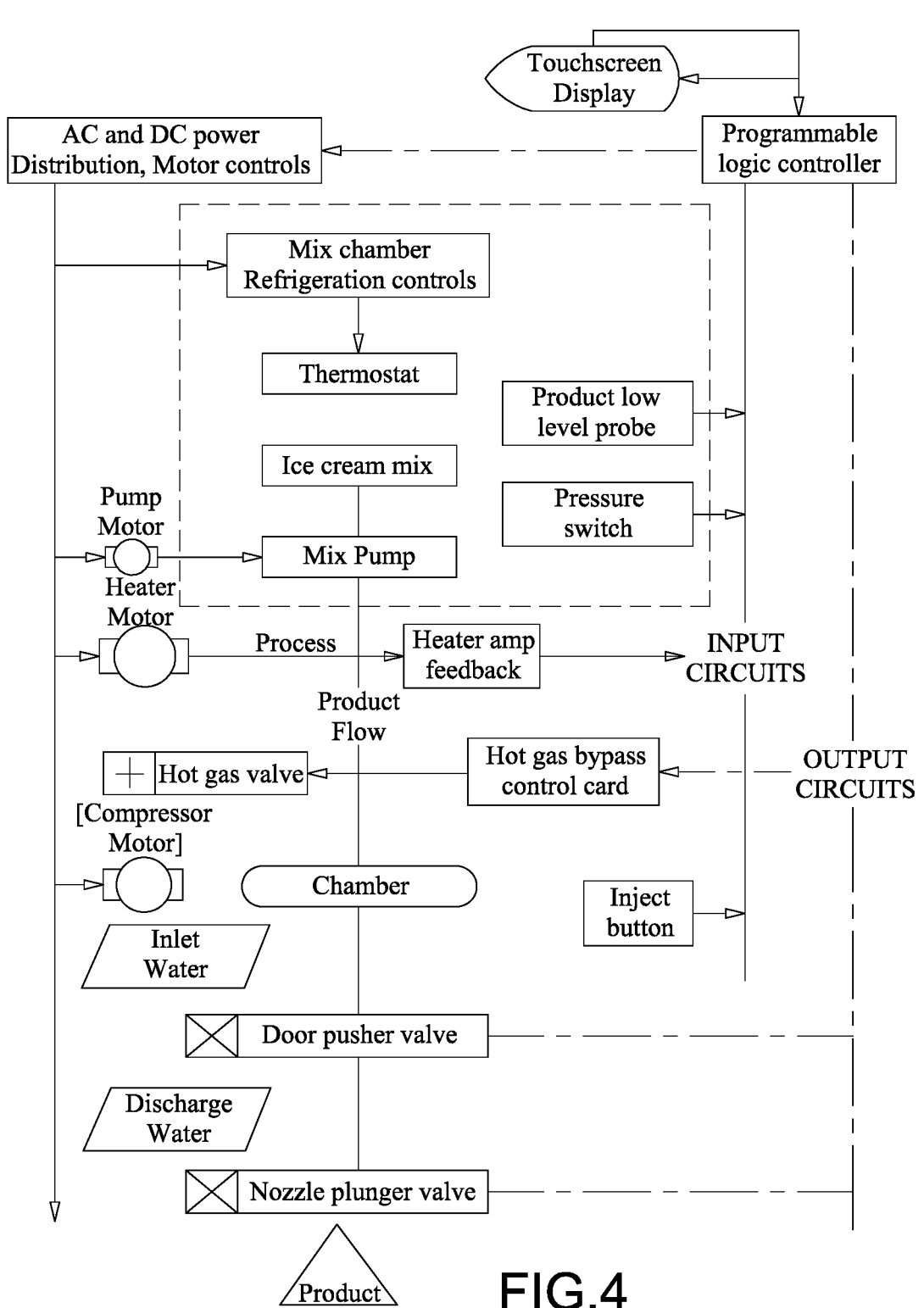
FIG. 4 is a flow chart illustrating an exemplary pipeline of all flow passages of an ice cream or yogurt machine.
Figure 5:
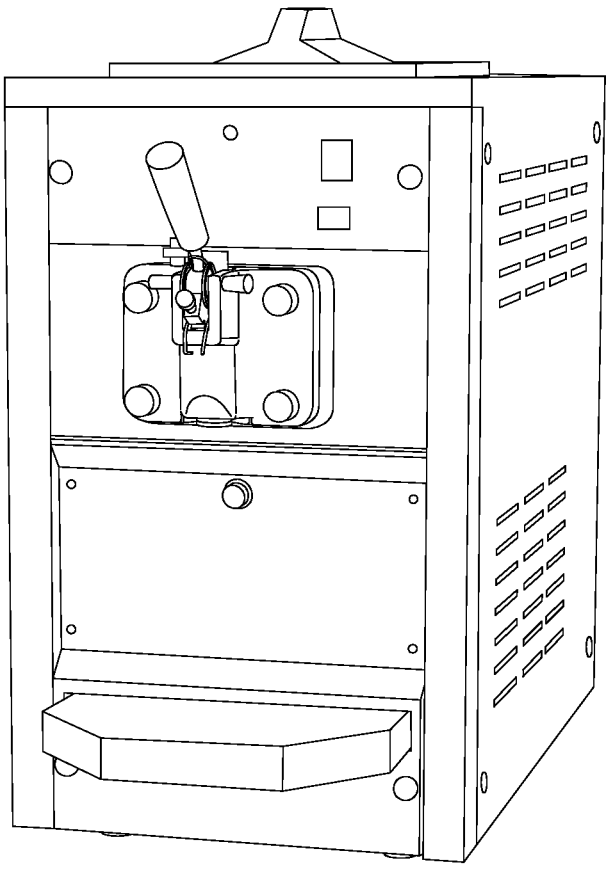
FIG. 5 is a perspective view of an ice cream or yogurt machine according to a third preferred embodiment of the present invention.

Referring to FIGS. 5 to 8, a system for automatically cleaning and washing an ice cream or yogurt machine according to a third preferred embodiment is illustrated. The system for cleaning and washing an ice cream or yogurt machine according to the third preferred embodiment of the present invention can be applied to the ice cream or yogurt machine as shown in FIGS. 5-8 or any conventional ice cream or yogurt machine as shown in FIG. 3, which illustrates a block diagram of a conventional ice cream or yogurt machine 10' such as the U.S. Pat. No. 6,145,701 as an example, wherein an ice cream or yogurt machine comprises a liquid container 1', a freezing cylinder 2', a mix hopper 14' for containing soft-serve material mixed by one or more raw materials stored in the liquid container 1' and being in flow communication with the freezing cylinder 2', a pipeline 3' connecting the liquid container 1' and the mix hopper 14' to the freezing cylinder 2' and the freezing cylinder 2' to a draw spout device 41' of a dispensing device 4' via a plunger 42' thereof, and a beater assembly 21' installed within the freezing cylinder 2' for expelling frozen soft-serve product such as ice cream or yogurt from the freezing cylinder 2' via the pipeline 3' to the draw spout 41'. As shown in FIG. 4, a pipeline of all flow passages such as U.S. Pat. No. 8,335,587 is illustrated as an example, wherein a pump 8' is provided to pump the raw materials though the freezing cylinder 2' and the pipeline 3' to produce frozen soft-serve product such as ice cream or yogurt to be dispensed at the draw spout 41' of the dispensing device 4', as illustrated in FIG. 6C.

Figure 7:
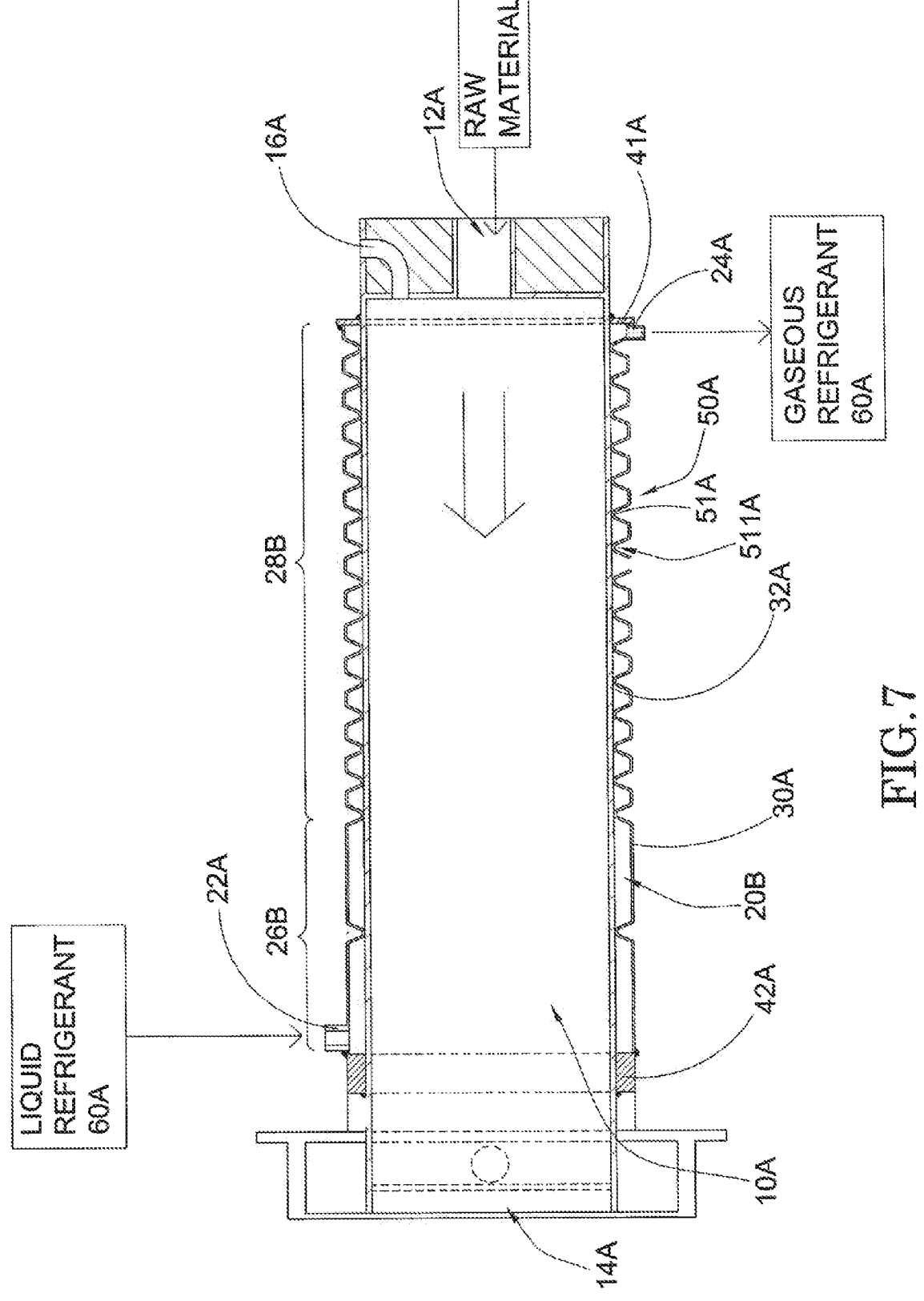
FIG. 7 is a sectional view of a freezing cylinder according to the above third preferred embodiment of the present invention.

The freezing cylinder 2' can be the conventional freezer barrel as illustrated in the U.S. Pat. Nos. 6,145,701 and 8,335,587 or an improved direct expansion evaporator as disclosed in the U.S. Pat. Nos. 8,272,231 and 8,534,086 invented by the inventor of this application, as shown in FIG. 7, wherein the freezing cylinder (direct expansion evaporator) 2' comprises a feeding channel 10A' and a heat exchange channel 20A thermally communicating with the feeding channel 10A' for heat exchanging.

The feeding channel 10A' has a feeding end 12A' and an opposite dispensing end 14A for the one or more raw materials of ice cream or yogurt feeding through the feeding channel 10A from the feeding end 12A' to the dispensing end 14A'. An air inlet 16A' is also formed at the feeding end 12A' of the feeding channel 10A' to enable air and the one or more raw materials being mixed together before the mixed one or more raw materials are heat-exchanged with the refrigerant 60A'.

The heat exchange channel 20A' has an inlet 22A' and an outlet 24A' preferably for the refrigerant 60A' flowing through the heat exchange channel 20A', wherein the feeding channel 10A' is coaxially aligned with the heat exchange channel 20A'. Accordingly, the refrigerant 60A' is guided to pass through the heat exchange channel 20A' from the inlet 22A' to the outlet 24A' for heat exchanging with the raw material within the feeding channel 10A'. Therefore, the one or more raw materials are guided to enter into the feeding end 12A' of the feeding channel 10A' while the frozen soft-sever product, i.e. ice cream or yogurt, is guided to exit the dispensing end 14A' of the feeding channel 10A'.

The inlet 22A' of the heat exchange channel 20A' is preferably located adjacent to the dispensing end 14A' of the feeding channel 10A', while the outlet 24A' of the heat exchange channel 20A' is located adjacent to the feeding end 12A' of the feeding channel 10A'. Therefore, a flow direction of the refrigerant 60A' flowing from the inlet 22A' to the outlet 24A' of the heat exchange channel 20A' is concurrent and opposite to a feeding direction of raw material feeding from the feeding end 12A' to the dispensing end 14A' of the feeding channel 10A', so as to efficiently freezing the raw material to the frozen product. Alternatively, the flowing direction of the refrigerant 60A' and the feeding direction of the raw material may be in the same direction depending on the design and purpose of the direct expansion evaporator. However, the opposite direction between the refrigerant 60A' and the one or more raw materials as the preferred embodiment will enhance the energy efficiency of the heat exchange process.

It is worth mentioning that, the heat exchange channel 20A' and the feeding channel 10A' may be formed in variety of shapes for the refrigerant 60A' and the one or more raw materials passing therewithin respectively. The heat exchange channel 20A' may thermally communicate with the feeding channel 10A' for heat exchanging with the raw material in a plurality of configurations to achieve the heat transport between one medium, embodied as refrigerant, to another medium, embodied as raw material for making frozen product.

In particular, the traveling path of the heat exchange channel 20A', i.e. the helix distance between the inlet 22A' and the outlet 24A' of the heat exchange channel 20A', is long enough for phase-changing the refrigerant 60A' that the refrigerant 60A' is in liquid phase under a predetermined high pressure when entering into the heat exchanging channel 20A' and is in gaseous phase when exiting the heat exchanging channel 20A'.

Accordingly, the thermal energy, which is needed for making the frozen soft-serve product, is preferably through the phase change between the liquid phase and the gaseous of the refrigerant 60A'. The refrigerant 60A' is preferably in liquid phase under a predetermined high pressure when entering into the heat exchange channel 20A' through the inlet 22A'. The liquid phase refrigerant 60A' is rapidly converting into gaseous phase after the refrigerant 60A' entering the heat exchange channel 20A' due to an expansion of area within the heat exchange channel 20A' and a pressure drop to decrease the boiling point of the refrigerant 60A'. In addition, the thermal energy is exchanged between the refrigerant 60A' and the raw material. Therefore, a negative thermal energy is released via the absorption of the phase change of the refrigerant 60A' from liquid to gaseous state. Thus, the refrigerant 60A' is able to be evaporated to gaseous phase in an expansion manner, so as to prevent a back flow of the liquid refrigerant 60A' and to maximize the cooling capacity.

In other words, the liquid refrigerant 60A' is in gaseous phase exiting the heat exchange channel 20A' through the outlet 24A', such that the thermal energy can be totally release from the phase change of liquid refrigerant 60A' to gaseous state. For example, the refrigerant 60A' may be stored in a high pressure container in liquid state. The liquid refrigerant 60A' may be entered into the heat exchange channel 20A' in a pressurized manner, so that the liquid refrigerant 60A' is rapidly evaporated in the relatively lower pressure and larger space of heat exchange channel 20A'. The conversion of the liquid phase to gaseous phase is an absorption reaction, so that the refrigerant 60A' absorbs a significant amount of heat from the raw material in the feeding channel 10A', so as to release negative thermal energy for making the frozen product.

In order to form the heat exchange channel 20A' from the outer guiding duct 30A', the outer guiding duct 30A' is pressed by machine at the outer surrounding wall of the outer guiding duct 30A'. Accordingly, a helix indention 50A' is formed at the outer guiding duct 30A' to form the heat exchange channel 20A' partitioned by a helix partition 51A', wherein a peak 511A' of the helix partition 51A' is biased against the outer surrounding wall of the inner guiding duct 32A' to conceal the heat exchange channel 20A' along the inner guiding duct 32A' in a weld-less manner.

It is worth mentioning that the above description of the conventional ice cream or yogurt machines and freezing cylinder is merely for facilitating the illustration of features of the present invention but not intending to form any limitation to the scope of the present invention.

According to the third preferred embodiment of the present invention, it is appreciated that the system for cleaning and washing ice cream or yogurt machine includes existing components of the machine without the need to install additional expensive or complicated devices or to have too much modification in structure to the machine. It is not only to be applied in the new made machine but also convenient in modifying any existing machine to perform the automatic cleaning and washing function for the machine.

According to the above preferred embodiments, the system for cleaning and washing the ice cream or yogurt machine includes components of the machine, including at least the freezing cylinder 2' for freezing the raw materials feeding from the liquid container 1' to produce the frozen soft-serve product such as ice cream or yogurt, the pipeline 3' connecting the liquid container 1' with the freezing cylinder 2' and the freezing cylinder 2' to the dispensing device 4', the pump 8' adapted for pumping the one or more raw materials from the liquid container 1' to the freezing cylinder 2' and the frozen soft-serve product from the freezing cylinder 2' to the dispensing device 4' via the pipeline 3' which comprises a feeding pipeline 31' connecting the liquid container 1' with the freezing cylinder 2' and a dispensing pipeline 32' connecting the freezing cylinder 2' with the dispensing device 4', and a control module 5' adapted for controlling the operation of the feeding of the raw materials from the liquid container 1' to the freezing cylinder 2' by the pump 8', the operation of the heat exchange of the freezing cylinder 2', the operation of the dispensing of the frozen soft-serve product from the freezing cylinder 2' to the dispensing device 4', and the dispensing operation of the dispensing device 4'. The control module 5' is modified from the control panel of the general ice cream or yogurt machine that not only executes and controls the operation of the freezing cylinder 2' to make ice cream or yogurt and the dispensing of the ice cream or yogurt soft-serve product through the dispensing device 4', but also further includes an on/off module 51' and a cleaning operation module 52', wherein the on/off module 51' controls the cleaning and washing time and activates the cleaning operation module 52' to control the unfrozen and draining out of the remaining raw material and ice cream or yogurt in the freezing cylinder 2' and pipeline 3' as well as the feeding of the detergents and water for cleaning and washing of the freezing cylinder 2' and pipeline 3'.

Figure 6A:
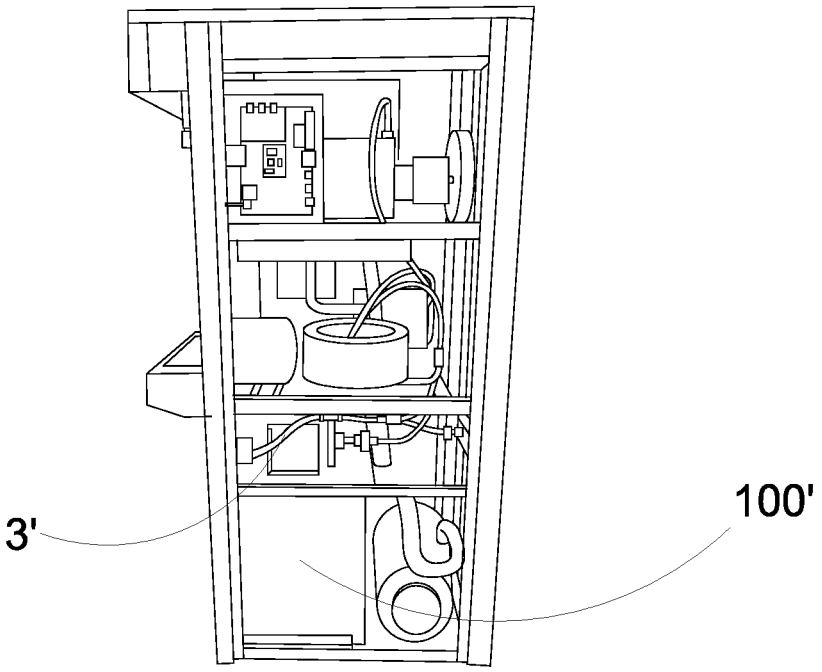
FIG. 6A is a schematic view illustrating the liquid container receiving chamber of the ice cream or yogurt machine according to the above third preferred embodiment of the present invention.
Figure 6A:
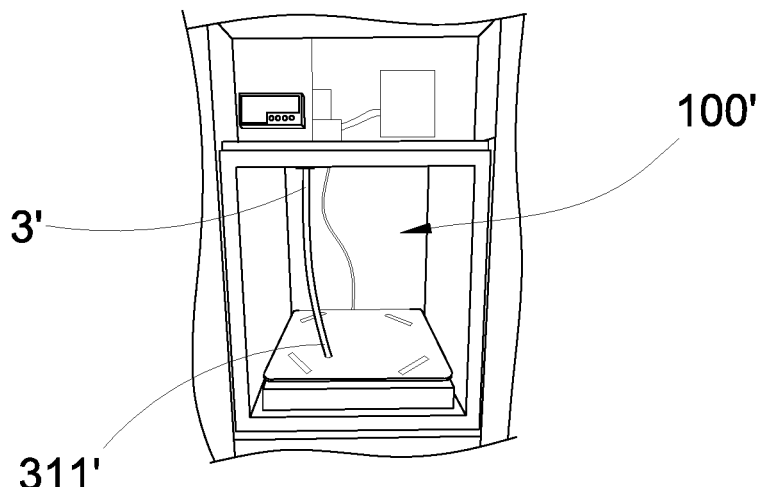

In order to provide the automatic cleaning and washing system for the ice cream or yogurt machine as described above, the system further comprises a rinse liquid supply 10' for supplying rinsing liquid which is embodied as a rinse containing device 11' in the third preferred embodiment for replacing the liquid container 1' in the liquid container receiving chamber 100' during the cleaning and washing operation, as shown in FIG. 6A. The rinse containing device 11' comprises a detergent tank 111' for storing one or more detergents, preferable edible detergents, and a water tank 112' for storing rinse water, wherein the inlet terminal 311' of the feeding pipeline 31' of the pipeline 3' which is originally placed in the liquid container 1' for pumping raw materials in the liquid container 1' to the freezing cylinder 2' is also moved to place in the detergent tank 111' or the water tank 112' of the rinse containing device 11'. It is worth mentioning that the detergent tank 111' and the water tank 112' can be the same tank body that when the one or more detergents are stored therein, it is functioning as the detergent tank 111' and, when the rinse water is stored therein, it is functioning as the water tank 112'.

Figure 6B:
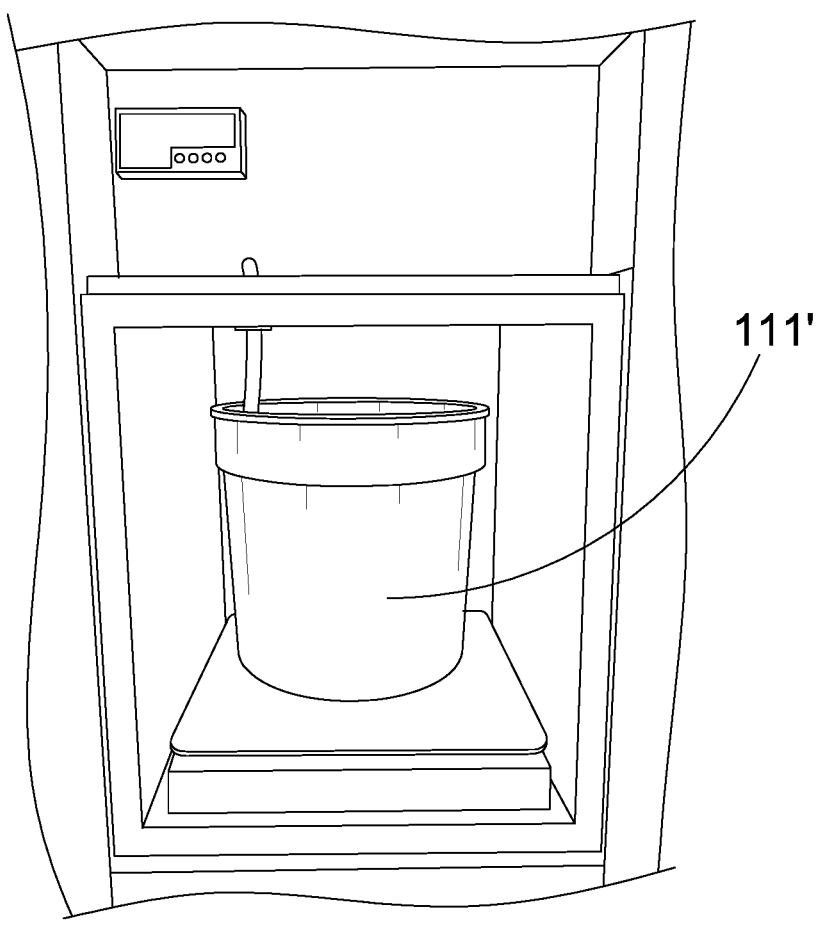
FIG. 6B is a schematic view illustrating an alternative mode of rinse liquid supply of the ice cream or yogurt machine according to the above third preferred embodiment of the present invention.
Figure 6C:
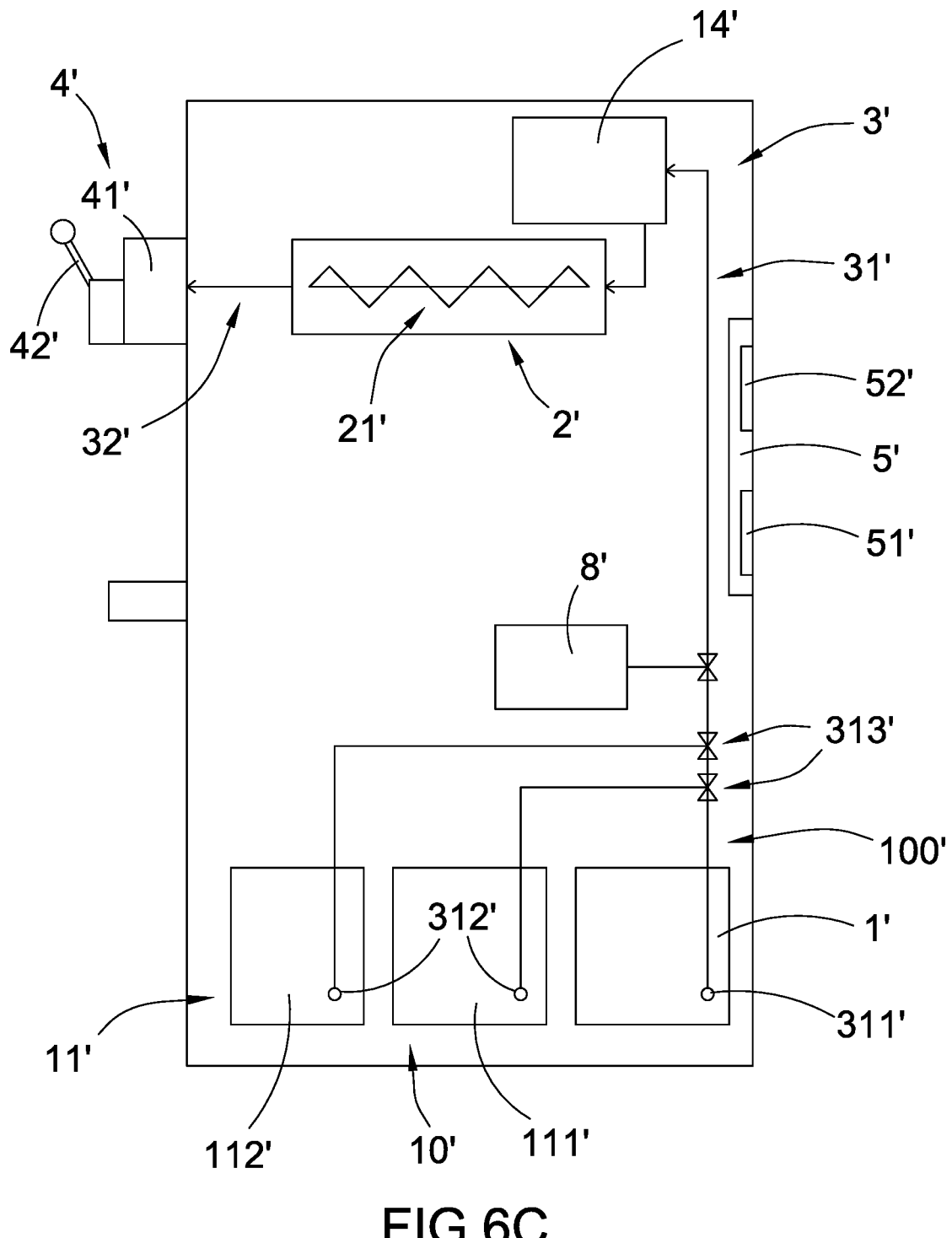
FIG. 6C is a schematic view illustrating another alternative mode of rinse liquid supply of the ice cream or yogurt machine according to the above third preferred embodiment of the present invention.

Alternatively, the rinse liquid supply 10' may also comprises a rinse containing device 11' and a water supply 12', wherein the rinse containing device 11' merely comprises a detergent tank 111' which can be selectively installed in the ice cream or yogurt machine to replace the liquid container 1' during the cleaning and washing time so that no extra space is required to place the detergent tank 111', as shown in FIG. 6B. Or, alternatively, when a new ice cream and yogurt machine is made, additional space can also be designed to install the rinse containing device 11', as shown in FIG. 6C, wherein a second inlet terminal 312' of the feeding pipeline 31' of the pipeline 3' is connected therein where a feeding three-way valve 313' is installed between the inlet terminal 312' and the second inlet terminal 312' of the feeding pipeline 31' for selectively switching the feeding of the raw materials in the liquid container 1' or the detergents in the detergent tank 111' into the feeding pipeline 31' by the cleaning operation module 52' of control module 5'. The water supply 12' comprises a water supply pipeline 121' having one end connected to a water source such as a water faucet and another end connected to the feeding pipeline 31' If the pipeline 3' via a three-way valve 313' which is controlled by the cleaning operation module 52' of the control module 5'.

Figure 8:
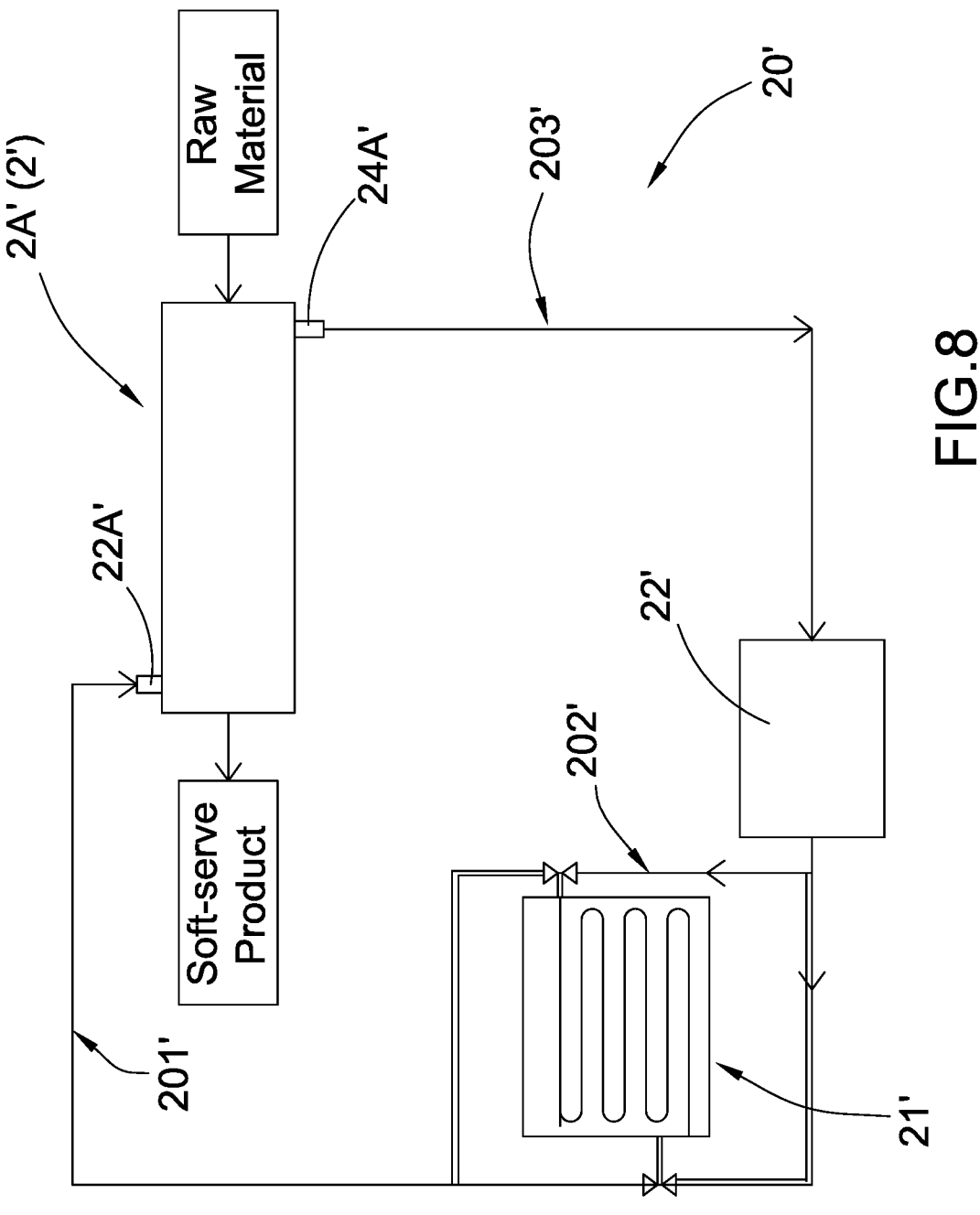
FIG. 8 is a block diagram illustrating the thermal exchange arrangement of the ice cream and yogurt machine according to the above third preferred embodiment of the present invention.

Referring to FIG. 8, a thermal exchange arrangement 20' of the ice cream or yogurt machine according to the third preferred embodiment of the present invention is illustrated, wherein the thermal exchange arrangement 20' comprises the freezing cylinder 2', such as the direct expansion evaporator 2A' as disclosed above as an example, a thermal exchange device 21', such as a condenser, having a first outlet 211' connecting to the inlet 22A' of the direct expansion evaporator 2A' (freezing cylinder 2') with a first refrigerant duct 201' for feeding cold liquid refrigerant 60A' into the exchange channel 20A' of the freezing cylinder 2' (direct expansion evaporator 2A'), and a compressor 22' connecting to the thermal exchange device 21' with a compressor duct 202' for compressing refrigerant to feed in the thermal exchange device 21' and to the outlet 24A' of the direct expansion evaporator 2A' (freezing cylinder 2') with a second refrigerant duct 203' for receiving gaseous refrigerant from the outlet 24A' and delivering back to the compressor 22'. According to the third preferred embodiment of the present invention, the thermal exchange arrangement 20' further comprises a third refrigerant duct 204' having one end connected to the thermal exchange device 21' to collect heated refrigerant and another end connected the inlet 22A' of the direct expansion evaporator 2A' (freezing cylinder 2'), wherein the compressor 22' and the three-way valve 23' are controlled by the cleaning operation module 52' of the control module 5'.

According to the third preferred embodiment of the present invention, the heating unit 7, 7A as described in the above first and second preferred embodiments is embodied as the thermal exchange arrangement 20' to produce heat to melt and dissolve the frozen ice cream or yogurt residue in the freezing cylinder 2' and pipeline 3' and be absorbed by the detergents and/or rinse water to enhance the cleaning and washing ability to the freezing cylinder 2' and the pipeline 3'. This is accomplished by the thermal exchange device 21' of the thermal exchange arrangement 20'. The thermal exchange device 21' substantially conducts thermal exchange to produce cold air and hot air at the same time. When the thermal exchange device 21' is functioned for refrigeration and used to condense gaseous form refrigerant from the outlet 24A' to liquid form refrigerant for feeding to the inlet 22A' of the exchange channel 20A' of the freezing cylinder 2' during the normal operation of producing soft-serve ice cream or yogurt product by the freezing cylinder 2'. However, when the cleaning and washing operation of the machine is activated by the on/off module 51' of the control module 5', the cleaning operation module 52' of the control module 5' activates the thermal exchange device 21' to function in a reverse way as a heater (functioned as the heating unit 7, 7A as described in the above first and second embodiments) to product heat and the inlet 22A' of the freezing cylinder 2' is switched to connect to the third refrigerant duct 204' so that the heated refrigerant produced by the heat transfer of the thermal exchange device 21' is fed into the exchange channel 20A' of the freezing cylinder 2' to heat up the raw materials, the frozen ice cream or yogurt residue, the detergents, and/or the rinse water in the freezing cylinder 2'.

If the detergent tank 111' is used to replace the liquid container 1', after the business hours, firstly, stop feeding raw materials into the freezing cylinder 2' and, when the scheduled cleaning and washing operation time starts, the remaining raw materials or frozen ice cream or yogurt soft-serve product contained in the freezing cylinder 2' are drained out via the dispensing pipeline 32' and dispensing device 4' automatically or manually, and then the liquid container 1' is replaced with the detergent tank 111' of the rinse containing device 11' and the inlet terminal 311' of the feeding pipeline 31' of the pipeline 3' of the machine is placed into the detergents in the detergent tank 111'. Then, when the preset automatic cleaning and washing predetermined time starts, the thermal exchange device 21' is activated to reversely function as the heating unit to circle heated refrigerant to the exchange channel 20A' of the freezing cylinder 2' to warm up and melt the residues of the raw materials and/or frozen ice cream or yogurt in the feeding channel 10A' of the freezing cylinder 2' for ease of cleaning out, and then the one or more detergents contained in the detergent tank 111' which may further be mixed with water for desired concentration are pumped into the feeding pipeline 31', fed into and through the feeding channel 10A' of the freezing cylinder (direct expansion evaporator) 2' to wash out the residues of the dissolved raw materials and ice cream or yogurt in the freezing cylinder 2', and dispensed through the dispensing pipeline 32' and the dispensing device 4', wherein the thermal exchange device 21' may continuously be operated as the heating unit to circle heated refrigerant to the exchange channel 20A' of the freezing cylinder 2' to warm up and dissolve the detergents and rinse water to facilitate the cleaning and washing the feeding channel 10A' of the freezing cylinder 2'.

If the additional detergent tank, which is either installed in the machine or outside the machine, is arranged, after the business hours, stop feeding raw materials into the freezing cylinder 2' and, when the scheduled cleaning and washing operation time starts, the remaining raw materials and ice cream or yogurt contained in the freezing cylinder 2' are drained out via the dispensing pipeline 32' and dispensing device 4' automatically or manually, wherein the draining out of the raw materials or unfrozen ice cream or yogurt soft-serve product contained in the freezing cylinder 2' may also set to be processed automatically by the the/off module 51' of the control module 5' when the preset automatic cleaning and washing predetermined time starts. Then, the thermal exchange device 21' is activated to reversely function as the heating unit to circle heated refrigerant to the exchange channel 20A' of the freezing cylinder 2' to warm up and dissolve the residues of the raw materials and/or frozen ice cream or yogurt in the feeding channel 10A' of the freezing cylinder 2' for ease of cleaning out, and then the one or more detergents contained in the detergent tank 111' which may further be mixed with water for desired concentration are pumped into the feeding pipeline 31', fed into and through the feeding channel 10A' of the freezing cylinder (direct expansion evaporator) 2' to wash out the residues of the dissolved raw materials and ice cream or yogurt in the freezing cylinder 2', and dispensed through the dispensing pipeline 32' and the dispensing device 4', wherein the thermal exchange device 21' may continuously be operated as the heating unit to circle heated refrigerant to the exchange channel 20A' of the freezing cylinder 2' to warm up and dissolve the detergents and rinse water to facilitate the cleaning and washing the feeding channel 10A' of the freezing cylinder 2'.

According to the third preferred embodiment of the present invention, it does not require to disassemble any component of the ice cream or yogurt machine but simply preset the cleaning and washing time to a predetermined operation time, generally after business hours even every day and the machine will execute the cleaning and washing operation of the freezing cylinder 2' and the pipeline 3' automatically without any manual monitoring or operation.

Accordingly, the present invention provides a method of automatically cleaning and washing the ice cream or yogurt machine according to the above preferred embodiments, which comprises the following steps:

(A) Record a preset of a predetermined automatic cleaning and washing operation time in the on/off module 51' of the control module 5' and activating the cleaning operation module to process when the preset operation time starts.

(B) Stop the feeding of the one or more raw materials into the freezing cylinder 2'.

(C) Drain out the remaining raw materials and/or soft-serve product, such as ice cream or yogurt, from the freezing cylinder 2' via the dispensing pipeline 32' and the dispensing device 4'.

(D) Heat to melt the frozen residues of the raw materials and ice cream or yogurt in the freezing cylinder 2' and drain out the unfrozen residues of the raw materials and ice cream or yogurt in the freezing cylinder 2' and pipeline 3' through the dispensing pipeline and the dispensing device.

(E) Feed the one or more detergents which may be mixed with water to reach a desired concentration through the feeding channel 10A' of the freezing cylinder 2' and pipeline 3', until the feeding channel 10A' inside the freezing cylinder 2' and the pipeline 3' are cleaned and washed out all residues of the raw materials and ice cream or yogurt.

(F) Feed rinse water through the feeding channel 10A' of the freezing cylinder 2' and pipeline 3' until they are cleaned and washed.

The step (E) further comprises the step of heating detergents by the heating unit (thermal exchange arrangement) in the freezing cylinder 2'.

The step (F) further comprises the step of heating the rinse water periodically by the heating unit (thermal exchange arrangement) in the freezing cylinder 2'. In other words, the rinse water fed to clean and wash the feeding channel 10A' of the freezing cylinder 2' and the pipeline 3' is selectively heated for a predetermined of time and then is not heated and remained in room temperature or cold in alternation for couple times.

The above steps (A) to (F) are executed automatically upon the control of the control module 5' without labor and manual monitoring or operation.

The step (D) further comprises the steps of:

(D1) switching the refrigeration function of the thermal exchange arrangement 20' to heating function; and (D2) feeding the heating refrigerant into the exchange channel 20A' of the freezing cylinder 2' to heat the feeding channel 10A' of the freezing cylinder 2'. This heating step (D2) is continuously or selectively executed and controlled by the cleaning operation module 52' of the control module 5' during the step (E) and step (F) to heat the feeding channel 10A' of the freezing cylinder 2' so as to heat up detergents and rinse water feeding therethrough to enhance the cleaning and washing ability of the detergents and rinse water.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A cleaning and washing system for automatically cleaning and washing a pipeline and a freezing cylinder of an ice cream or yogurt machine, comprising:

a thermal exchange arrangement;

a rinse containing device arranged to store at least one rinse water and at least one detergent; and a control module adapted to control an on/off and a cleaning operation that, the at least one rinse water and the at least one detergent for selectively feeding into the pipeline and the freezing cylinder to clean and wash the freezing cylinder and the pipeline, wherein the thermal exchange arrangement is connected to the freezing cylinder and operated as a heating unit to melt and drain one or more residues in the pipeline and the freezing cylinder, wherein firstly, the at least one rinse water is passing through the pipeline and the freezing cylinder while operating the thermal exchange arrangement to heat the at least one rinse water feeding through the pipeline and the freezing cylinder to melt and absorb the one or more residues in the pipeline and the freezing cylinder and drain the one or more residues absorbed by the rinse water from the pipeline and the freezing cylinder, and secondly, the at least one rinse water and the at least one detergent are passing through the pipeline and the freezing cylinder to clean and wash the pipeline and the freezing cylinder while the thermal exchange arrangement is operated to heat the at least one rinse water feeding through the freezing cylinder, and finally, the at least one rinse water is fed through the pipeline and the freezing cylinder in order to remove and drain out any remaining detergent residue in the pipeline and the freezing cylinder.

2. The cleaning and washing system, as recited in claim 1, wherein when the thermal exchange arrangement is operated as the heating unit and controlled by the control module, the one or more residues frozen in in the pipeline and the freezing cylinder is heated up and melted and then drained out through the dispensing device.

3. The cleaning and washing system, as recited in claim 2, wherein the at least one detergent and the at least one rinse water fed into the freezing cylinder are also heated up by the heating unit.

4. The cleaning and washing system, as recited in claim 3, wherein the heating unit is the thermal exchange arrangement which is controlled by the control module and switched from refrigeration function to heating function to heat up the detergent and the rinse water during the cleaning operation activated by the control module.

5. The cleaning and washing system, as recited in claim 4, wherein the rinse containing device includes a tank for storing at least one of the at least one rinse water and the at least one detergent for cleaning and washing the pipeline and the freezing cylinder.

6. The cleaning and washing system, as recited in claim 3, wherein the rinse containing device includes a tank for storing at least one of the at least one rinse water and the at least one detergent for cleaning and washing the pipeline and the freezing cylinder.

7. The cleaning and washing system, as recited in claim 2, wherein the heating unit is the thermal exchange arrangement which is controlled by the control module and switched from refrigeration function to heating function to heat up the residues of the ice cream or yogurt during the cleaning operation activated by the control module.

8. The cleaning and washing system, as recited in claim 1, wherein the heating unit is the thermal exchange arrangement which is controlled by the control module and switched from refrigeration function to heating function to heat up the residues of the ice cream or yogurt during the cleaning operation activated by the control module.

9. The cleaning and washing system, as recited in claim 8, wherein the rinse containing device includes a tank for storing at least one of the at least one rinse water and the at least one detergent for cleaning and washing the pipeline and the freezing cylinder.

10. The cleaning and washing system, as recited in claim 1, wherein the rinse containing device includes a tank for storing at least one of the at least one rinse water and the at least one detergent for cleaning and washing the pipeline and the freezing cylinder.

11. A method of cleaning and washing a pipeline and a freezing cylinder of an ice cream or yogurt machine, comprising steps of:

(a) turning off a normal operation of the freezing cylinder to stop feeding raw materials from a liquid container to the freezing cylinder and to stop a thermal exchange device to function for refrigeration, and activating a cleaning operation module to turn on a cleaning operation automatically;

(b) activating the thermal exchange device to function as a heating unit to produce heat, heating the freezing cylinder through the thermal exchange device to warm up and melt a residue of the ice cream or yogurt inside the freezing cylinder, and draining out the residue of the ice cream or yogurt inside the freezing cylinder via a dispensing pipeline of the pipeline and a dispensing device;

(c) feeding a water from a water tank by a pump into a feeding channel of the freezing cylinder through a feeding pipeline of the pipeline to absorb the residue of the ice cream or yogurt in the pipeline and the freezing cylinder, and draining the residue of the ice cream or yogurt absorbed by the water from the pipeline and the feeding channel of the freezing cylinder through the dispensing pipeline of the pipeline and the dispensing device, while the thermal exchange device continuously being operated as the heating unit to heat the water feeding through the feeding channel of the freezing cylinder;

(d) passing the water from the water tank and one or more detergents contained in a detergent tank by the pump through the feeding pipeline of the pipeline for being fed into and through the feeding channel of the freezing cylinder and dispensed through the dispensing pipeline of the pipeline so as to clean and wash the pipeline and the freezing cylinder, while the thermal exchange device being operated as the heating unit to heat the water feeding through the feeding channel of the freezing cylinder;

(e) feeding the water from the water tank only by the pump through the pipeline and freezing cylinder to clean and drain out one or more residues of the one or more detergents in the feeding pipeline and dispensing pipeline of the pipeline and the feeding channel of the freezing cylinder by the water to prevent the one or more detergents remained inside the pipeline and the freezing cylinder; and (f) turning off the cleaning operation and turning on the normal operation of the freezing cylinder.

12. The method, as recited in claim 11, wherein in the step (b), during the cleaning operating of the pipeline and the freezing cylinder, the thermal exchange device is activated to function in a reverse way as the heating unit to produce heat and the inlet of the freezing cylinder is switched to connect a refrigerant duct which has one end connected to the thermal exchange device to collect a heating refrigerant and another end connected to the inlet of the freezing cylinder, such that the heating refrigerant is fed into the exchange channel of the freezing cylinder to heat up the residue of the ice cream or yogurt in the feeding channel of the freezing cylinder.

13. The method, as recited in claim 12, wherein the cleaning operation is turned on and turned off by the cleaning operation module according to predetermined times.

14. The method, as recited in claim 12, wherein the cleaning operation is turned on and turned off by the cleaning operation module according to a predetermined number of usage loads of the raw materials pumped to the freezing cylinder.

15. The method, as recited in claim 14, wherein a sensor is connected to the freezing cylinder for detecting the usage loads of the liquid containers.

16. The method, as recited in claim 15, wherein the step (d) further comprises a step of heating the water and the one or more detergents passing through the feeding channel of the freezing cylinder by the heating unit.

17. The method, as recited in claim 11, wherein the cleaning operation is turned on and turned off by the cleaning operation module according to predetermined times.

18. The method, as recited in claim 11, wherein the cleaning operation is turned on and turned off by the cleaning operation module according to a predetermined number of usage loads of the raw materials pumped to the freezing cylinder.

19. The method, as recited in claim 18, wherein a sensor is connected to the freezing cylinder for detecting the usage loads of the liquid containers.

20. The method, as recited in claim 11, wherein the step (d) further comprises a step of heating the water and the one or more detergents passing through the feeding channel of the freezing cylinder by the heating unit.

\* \* \* \* \*